US012770005B2

(12) United States Patent
Narayan

(10) Patent No.: US 12,770,005 B2
(45) Date of Patent: Oct. 20, 2026

(54) SYSTEMS AND METHODS FOR AN AGENTIC OPTIMIZATION FRAMEWORK FOR SUSTAINABLE FABRIC BLENDS

(71) Applicant: Anusha Narayan, San Carlos, CA (US)

(72) Inventor: Anusha Narayan, San Carlos, CA (US)

(73) Assignee: Anusha Narayan, San Carlos, CA (US)

( * ) Notice: Subject to any disclaimer, the term of this patent is extended or adjusted under 35 U.S.C. 154(b) by 0 days.

(21) Appl. No.: 19/056,486

(22) Filed: Feb. 18, 2025

(65) Prior Publication Data

US 2026/0244916 A1 Aug. 20, 2026

(51) Int. Cl.
*G06N 3/08* (2023.01)

(52) U.S. Cl.
CPC .................................... *G06N 3/08* (2013.01)

(58) Field of Classification Search
CPC ................................................... G06N 3/08
See application file for complete search history.

(56) References Cited

U.S. PATENT DOCUMENTS

2019/0130253 A1* 5/2019 Schultz .................... A41D 1/02
2022/0138986 A1* 5/2022 Wei .......................... G01J 3/50 382/157
2025/0054008 A1* 2/2025 Cella ...................... G06N 5/043

FOREIGN PATENT DOCUMENTS

CN 113970532 A * 1/2022 .......... G01N 21/359

* cited by examiner

*Primary Examiner* — Matthew Ell
*Assistant Examiner* — Ishan Moundi
(74) *Attorney, Agent, or Firm* — Travis Banta; Ascent IP Law

(57) ABSTRACT

Methods and systems of generating material compositions are determined by use of artificial intelligence techniques. Data about various fabric materials may be collected along with data representative of metrics about those fabric materials. Support data bout the location of the data storage containing the material metrics may also be collected. The material metrics may be used to create material metric values. The material metric values may be used to create a training set for a neural network and train the neural network to generate fabric blends according to specified preferences.

8 Claims, 3 Drawing Sheets

SYSTEMS AND METHODS FOR AN AGENTIC OPTIMIZATION FRAMEWORK FOR SUSTAINABLE FABRIC BLENDS

BACKGROUND

1. Technical Field

This disclosure relates generally to an artificial intelligence device which collects data, synthesizes data around a number of set parameters, and generates fabric blends that meet the set parameters while optimizing for sustainability factors.

2. Description of the Related Art

Some of the earliest known texts of human history describe the use of animal skins as clothing. Since fabric was largely unknown to the world at the time, animal skins, which could be considered leather, were a preferred choice for clothing, especially in colder climates where animal hides that maintained their hair or fur were desirable for protection from cold weather. It is likely that in warmer climates, plant based clothing was also used. Leaves, woven vines or plant fronds, flowers, or seeds (like cotton) were used as clothing for protection against the elements.

As humanity developed, new kinds of fabrics were discovered. For example, the ancient Egyptians used linen, which is a fabric derived from flax plants. Eastern cultures developed silk fabrics. Other cultures relied on wool, woven into fabric for clothing. Leather clothing was also used, even as humanity developed. Clothing began to become a status symbol in many cultures and brough about the beginning of a sense of fashion. Ancient Greece, for example, favored dyed or brightly colored linen or wool fabrics while other cultures favored embroidered clothing.

As time went on, styles of clothing also changed, from culture to culture. Some cultures relied on togas and tunics, such as the Romans while their enemies to the north wore full length trousers, for example. It is likely that both comfort and weather conditions had at least some effect on what became popular to wear amongst these different cultures. Fashion likely also had a significant effect on what was popular to wear.

Over time, as cultures were informed by other cultures, the preferred fabrics for clothing and public tastes changed. While animal skins were still used, leather became more expensive, pushing the poor towards cheaper fabrics such as linen, cotton, or wool in various locations. By the middle ages, cotton was widely imported into Europe for use in clothing. Silk also became extremely desirable for European nobility, which, among other goods, facilitated trade with East Asian and other Asian countries. Europe became a significant importer of various kinds of raw goods, specifically for making fabric and many industries grew around fabric creation, such as weavers, spinners, dyers, and clothing manufacturers.

Until very recently, on a human time scale of evolution, clothing was virtually all made from natural materials or their derivatives. Even as recently as World War II, soldiers wore cotton clothing during the fighting in the European and Pacific theaters. It was not until after World War II that synthetic fabrics became available and viable as clothing for the general public. Synthetic fabrics were developed by chemical synthesis rather than being a derivative of a plant or animal fiber. Examples of early synthetic fibers are nylon and rayon.

After World War II, many different synthetic fibers were developed, which are still popular and in use today, examples of which include polyester, spandex, Dacron, and dyneema. These synthetic fibers have certain favorable traits and certain unfavorable traits, such as their ability to combine with other natural fibers, their durability, and their relative comfort in use as clothing. The use of synthetic fibers for clothing has also largely driven fashion with attempts to make clothing more stylish while also making clothing lighter and more comfortable.

Synthetic fibers, as a result of a chemical process, have a particular downside. Specifically, synthetic fibers are known to be less sustainable than natural fibers. For example, the production of one kilogram of cotton emits 3.3 kilograms of carbon dioxide into the air where one kilogram of polyester emits 20 kilograms of carbon dioxide into the air. The fashion industry emits nearly four billion tons of carbon dioxide into the air annually, which is more than aviation and maritime shipping combined. Therefore, fabric choice is not only about fashion and comfort, but also about the effects of producing these fabrics on greenhouse gases and the environment.

It is, therefore, one object of this disclosure, to provide an artificial intelligence based fabric generation model. It is another object of this disclosure to provide an artificial intelligence model which collects data about individual fabrics, trains an artificial intelligence engine to identify certain characteristics or parameters of the fabrics, and provide fabric blends that meet the identified characteristics or parameters of the fabrics. It is a further object of this disclosure to provide fabric blends that replace conventional fabric blends at a lower environmental impact level.

SUMMARY

Disclosed herein are methods and systems of generating material compositions determined by use of artificial intelligence techniques. Data about various fabric materials may be collected along with data representative of metrics about those fabric materials. Support data bout the location of the data storage containing the material metrics may also be collected. The material metrics may be used to create material metric values. The material metric values may be used to create a training set for a neural network and train the neural network to generate fabric blends according to specified preferences.

BRIEF DESCRIPTION OF THE DRAWINGS

The accompanying drawings illustrate various embodiments of generative artificial intelligence neural network systems and methods.

DETAILED DESCRIPTION OF PREFERRED EMBODIMENTS

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Figure 1:
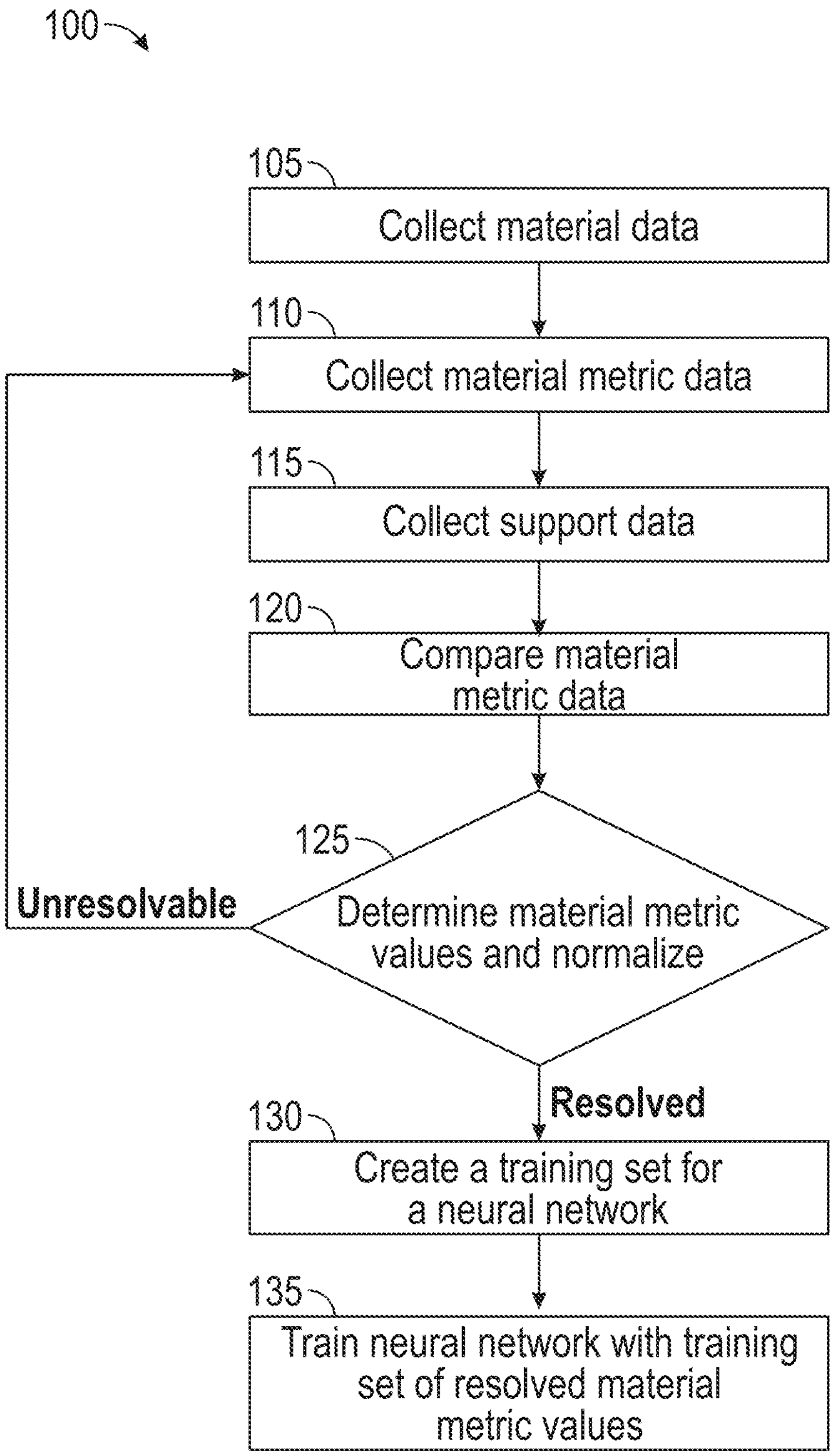
FIG. 1 illustrates a method for training a neural network to identify fabric characteristics or parameters.

FIG. 1 illustrates a method 100 for training a neural network to identify fabric characteristics or parameters. Method 100 may be executed by a processor utilizing deep learning techniques, neural networks, machine learning, generative artificial intelligence, or other artificial intelligence frameworks. In method 100, a processor operating in a neural network, may collect material data in step 105 from various sources, which include the internet, digital libraries, databases, or any other storage of digital information. Material data may include information about certain raw materials.

Exemplary raw materials may include organic cotton, Pima cotton, Egyptian cotton, recycled cotton, hemp, flax, jute, ramie, sisal, bamboo, kapok fiber coir, abaca, pina, banana fiber, nettle fiber, lotus fiber, soybean fiber, generic animal-based fiber, merino, shetland, lambswool, cashmere, mohair, angora, alpaca wool, vicuna wool, camel hair, yak wool, qiviut, llama fiber, feathers, down feathers, mulberry silk, tussar silk, eri silk, muga silk, spider silk, peace silk, nylon 6, nylon 66, recycled nylon, acrylic, spandex, elastane, modacrylic, olefin, vinyon, polypropylene, Cordura, dyneema, viscose, high-wet modulus rayon, modal, micromodal, lyocell, bamboo rayon, ECOVERO™, cupro, acetate, triacetate, seacell, soy silk, milk fiber, corn fiber, corn-based PLA fibers, orange fiber, vegan leather, recycled leather, suede, pinatex, mycelium leather, apple leather, grape leather, cactus leather, desserto, woocoa, vegea, zoa, cork fabric, bananatex, SCOBY leather, ECONYL, polycotton blend, cotton-polyester blend, wool-nylon blend, wool-silk blend, silk-linen blend, cotton spandex blend, elastane-cotton blend, elastane-polyester blend, loycocell-wool blend, bamboo-cotton blend, carbon fiber, and glass fiber.

In particular, at step 110 a processor operating in a neural network, may collect material metric data from various sources, which include the internet, digital libraries, databases, or any other storage of digital information. Material metric data may include information about characteristics of certain raw materials. The characteristics for material metric data may be one of an environmental characteristic, a durability characteristic, a comfort characteristic, or a cost characteristic.

In one embodiment, material metric data for an environmental characteristic for producing the material may include a water consumption metric (in liters per kilogram fiber), greenhouse gas emissions in carbon (e.g., carbon monoxide, carbon dioxide, etc.) per kilogram fiber), land use (in meters squared per kilogram fiber); pesticide usage (in kilograms per hectare); biodegradation time (in months), and energy consumption (in kilowatt hours per kilogram).

In another embodiment, a material metric data for a durability characteristic of the material may include a tensile strength (in megapascals), elongation at break (in percentages), Young's modulus (in gigapascals), abrasion cycles to failure (in number of cycles), burst strength (in kilopascals), and UV resistance (in percentage strength retained after 100 hours).

In another embodiment, a material metric data for a comfort characteristic of the material may include moisture retention (in percentages), air permeability (in liters per second per meter squared), thermal conductivity (in watts per meter kelvin), wicking rate (in millimeters per second), static resistance (in ohms) and UV protection factor (in an assigned factor).

In another embodiment, a material metric data for a cost characteristic of the material may include a raw material cost (in dollars per kilogram), processing cost (in dollars per kilogram), dyeing cost (in dollars per kilogram), waste percentage (in percentages), energy cost (in dollars per kilogram), and total manufacturing cost (in dollars per kilogram).

In one example, a neural network may utilize a large language model artificial intelligence engine to conduct a search across the internet, or any other digital source to identify material data and material metric data. Large language model artificial intelligence engine may find data related to each element of material metric data for each material. Further, the large language model artificial intelligence engine may provide each material metric data for each material to the neural network. The neural network may collect the material data, the material metric data, and material support data at step 115. Material support data may be a reference to where the large language model discovered the material data or the material metric data. For example, material support data may be a website, a citation to a book, a digital library, a database, or other location of where the material metric data was discovered by the large language model artificial intelligence engine and collected by the neural network.

In certain cases, material metric data from one source may not harmonize with material metric data from another source. For example, a stated manufacturing cost of hemp identified by one source may not be consistent with a stated manufacturing cost of hemp as identified by another source. The neural network processor may, at step 120, compare collected material metric data from different sources to identify differences between one or more sources of material metric data. At step 125, the neural network processor may determine material metric values and normalize the material metric values. In other words, the neural network processor may identify from the material metric data values for each element of material metric data for each element of material data. The metric data value may be a number for each element of material metric data. The neural network processor may determine that two values in the collected material metric data from different sources use different measurements (e.g., dollars per pound vs. dollars per kilogram). In such a case, the material metric data from the different sources may be normalized to share common measurements. The neural network processor at step 125 may further identify the collected support data to determine material metric values and may prioritize data from certain sources over other sources. For example, data from a scientific paper may be prioritized as a prime source where data from a website may be a secondary source. The neural network processor may determine, based on priority of source, that one value for collected material metric data is more likely to be accurate than other data and determine material metric values accordingly.

In the event that the neural network processor cannot resolve a material metric value for one element of material metric data, the neural network processor may cause method 100 to return to step 110 to collect additional material metric data, step 115 to collect additional support data, and step 120 to compare the material metric data until the neural network has obtained enough data to resolve material metric values and normalize the material metric values. If the neural network processor is able to determine material metric values and normalize those values, neural network processor 130 may create a training set or model for a neural network.

At step 130, the training set or model may include material metric values for each material and each material metric identified in the collected material metric data. At step 135, a neural network may be trained with a training set of resolved material metric values. For example, the artificial intelligence engine may produce a set of resolved material metric values for a neural network to apply to the raw materials identified in the material data. As will be discussed below, the material metric values may be used by a generative AI device to generate blends of raw materials that maximize certain characteristics while also providing the same or better of other characteristics based on the material metric values.

Figure 2:
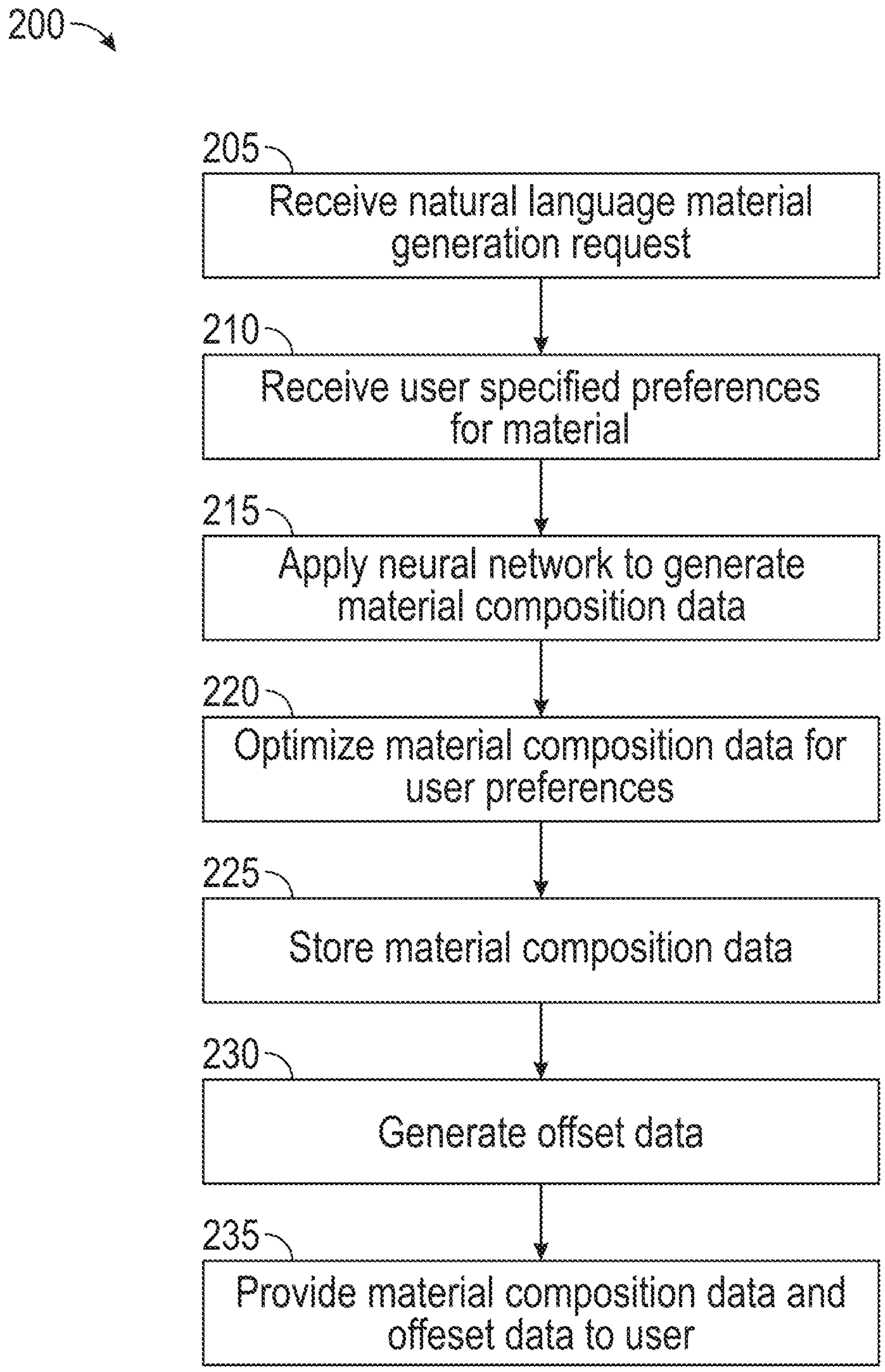
FIG. 2 illustrates a method for generating fabric blends.

FIG. 2 illustrates a method 200 for generating fabric blends. Method 200 may be executed by a neural network using artificial intelligence techniques. For example, method 200 may be executed by a processor utilizing deep learning techniques, neural networks, machine learning, generative artificial intelligence, recurrent neural networks, or other artificial intelligence frameworks. The neural network and neural network processor described with respect to FIG. 2 may be the same neural network described with respect to FIG. 1 or may be a different neural network which operates in conjunction with the neural network described with respect to FIG. 1. In either case, at step 205, the neural network processor may receive a natural language material generation request from a user. In response, the neural network processor may also receive specified preferences for a material at step 210. For example, the neural network may apply recurrent neural network techniques to utilize feedback loops for speech recognition and natural language processing to obtain digital information about the nature of the request from the user. The neural network processor may further request specified preferences for the material from the user and apply recurrent neural network techniques to the natural language request. The neural network processor may receive specified preferences for materials in the context of environmental characteristics, durability characteristics, comfort characteristics, and/or cost characteristics in any desired combination. For example, a user may request that the neural network produce the least expensive and highest comfort fabric blend based on the material metric data values identified above. At step 215, the neural network processor may apply environmental, durability, and cost characteristics to maximize and minimize those characteristics, as desired, using, for example, a sorting algorithm, including a Pareto distribution for the materials and eventual fabric blend. In general, the neural network processor seeks to minimize an environmental value, and a cost value while maximizing a durability value and a comfort value for a particular fabric blend.

This application of the neural network processor at step 215 may generate material composition data from the materials known to the neural network based on the material metric data values received as the training set for the neural network using generative artificial intelligence techniques. At step 215, the neural network processor may identify a number of fabric blends, or a range of fabric blends, which would be the user specified preferences. However, at step 220, the neural network processor may optimize material composition data for user preferences. For example, the neural network processor may identify which fabric blends (e.g., material composition) meet the user's preferences and the relative ratios of those blends. The identified fabric blends may be optimized based on sustainability to select those materials which have the lowest environmental value.

At step 225, the neural network processor may store the material composition data for the identified and optimized fabric blends. At step 230, the neural network processor may generate offset data which provides data representative of, for example, a percentage improvement in terms of increasing comfort or durability, a percentage improvement in decreasing cost, and a percentage improvement or an actual manufacturing value of the relative savings in environmental costs using the identified and optimized fabric blend over others. The offset data and the material composition data may be provided to a user at step 235. To ensure the fabric blend is manufacturable, the artificial intelligence processor may be manually limited to producing fabric blends of up to a certain number of materials, such as 4 or 5 materials per blend, for example.

For example, a garment that is typically made from 100% organic cotton may be made using a fabric blend or material composition determined by the neural network processor to be replaced by a blend of 28.46% coir, 7.47% abaca, 54.85% recycled polyester, 1.45% lycocell, and 7.77% glass fiber. The offset data may indicate that the improvements in environment characteristics is +30.46%, the improvement in cost is +15.40%, the improvement in durability is +1.09%, and the improvement in comfort is +83.49% over 100% organic cotton. Similar improvements are recognized as compared to 100% cashmere, where the blend of 28.46% coir, 7.47% abaca, 54.85% recycled polyester, 1.45% lycocell, and 7.77% glass fiber is a +52.71% improvement in environment characteristics, a 92.21% improvement in cost characteristics, and an improvement of +70.89% in comfort characteristics, while only having a decrease in durability characteristics of −1.36%. The fabric blend identified by the neural network processor significantly outperforms a 100% organic cotton or 100% cashmere fabric. One additional advantage is that the increase in sustainability in the fabric blend identified by the neural network processor is a benefit of a lower cost material, which makes the fabric blend identified by the neural network processor more desirable to manufacturers.

Figure 3:
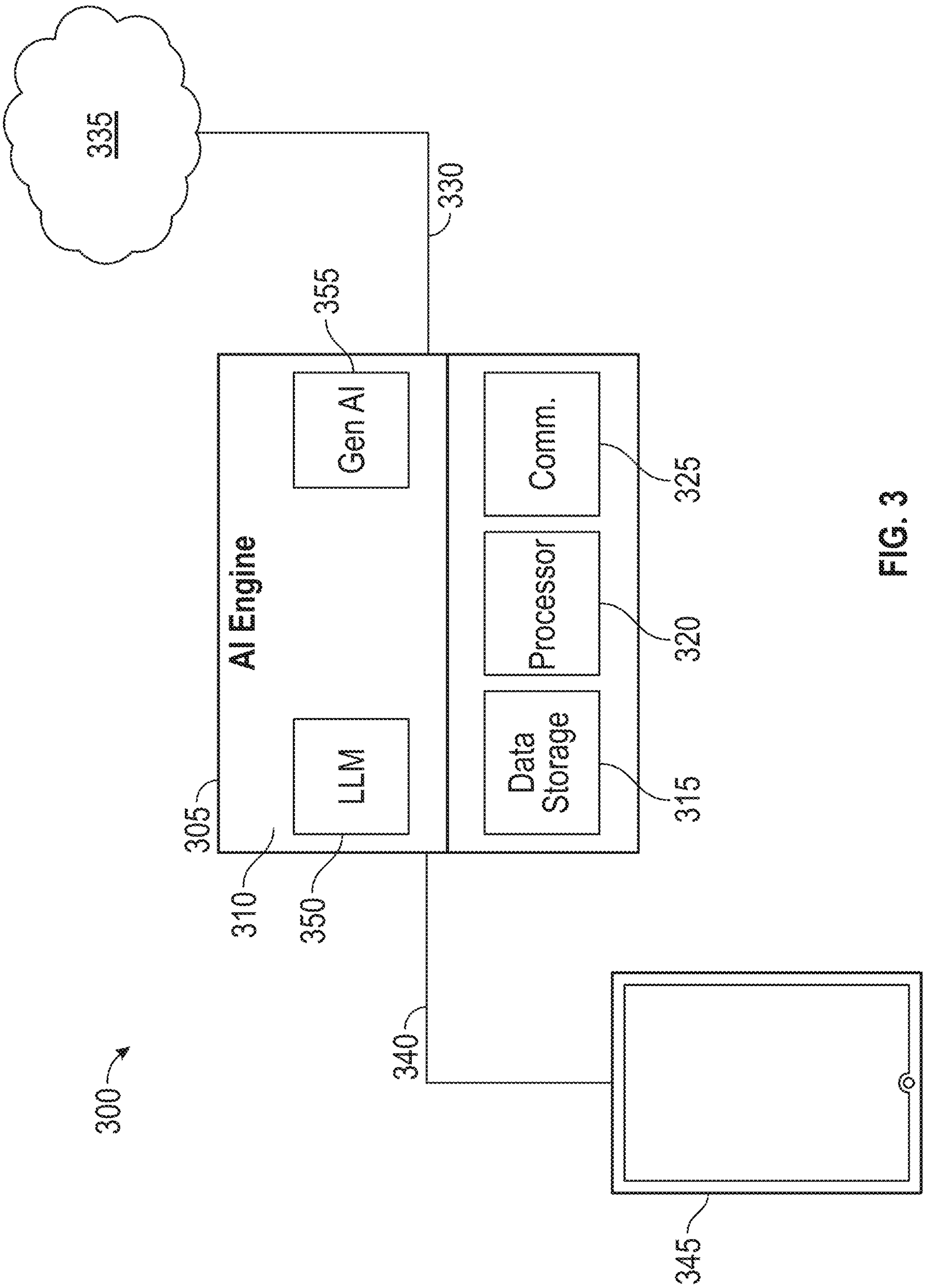
FIG. 3 illustrates an artificial intelligence system which uses a neural network to identify fabric characteristics or parameters and generate fabric blends.

FIG. 3 illustrates an artificial intelligence system 300 which uses a neural network to identify fabric characteristics or parameters and generate fabric blends. Artificial intelligence system 300 may be implemented with an artificial intelligence engine 305, which provides a neural network 310. Artificial intelligence system 305 may include a data storage device 315, a neural network processor 320, and at least one communication device 325. Neural network processor 320 may, for example, operate as the neural network processor discussed above with respect to FIG. 1 and FIG. 2. Artificial intelligence engine 305 may be connected to digital data sources 335 by a wired or wireless connection 330 to obtain digital information. Digital information in data sources 335 may include material data, material metric data, support data, or other data and may be obtained from digital libraries, the Internet, databases, or any other accessible digital information storage.

Artificial intelligence system 300 may further include a user device 345 which is connected to artificial intelligence system 305 by wired or wireless connection 340. User device 345 may be implemented as a laptop or desktop computer, a smartphone, a tablet device, a gaming console, or any other electronic device capable of sending and receiving electronic information. User device 345 may allow a user to interact with and provide information to artificial intelligence engine 305.

Artificial intelligence engine 305 may comprise a neural network 310, which incorporates a language learning model artificial intelligence element 350 and a generative artificial intelligence element 355. Artificial engine 305 may be implemented in a computing device, such as a server device, a cloud server device, a laptop computer, a desktop computer, a smartphone, a gaming console, or any other electronic device capable of sending and receiving information. As previously discussed, neural network 310 may direct language learning model artificial intelligence element to collect material data, material metric data, and support data. The material data, material metric data, and support data may be used to train generative artificial intelligence element 355 to generate material composition data, offset data, and provide the material composition data and offset data to user device 345.

In practice, large language model artificial intelligence element 350 may access data sources 335 by neural network processor 320 to obtain material data information, material metric data, and support data. Neural network processor 320 may compare the material metric data, resolve the data in terms of determining normalized material metric values, and create a training set for a neural network. The neural network processor 320 may train the neural network 310 with a training set of resolved material metric values. The neural network processor 320 may provide the training set to, for example, generative artificial intelligence element 355 to train the neural network 310 and generative artificial intelligence element 355 with the training data to generate material composition data.

In response to a request from a user, received, for example, from user device 345, and one or more preferences identified by the user, neural network 310 may be applied to generate material composition data based on the determined material metric data values. The generated material composition data may be optimized for the user preferences and may be generated with offset data. Once the material composition data is optimized and the offset data is determined, the material composition data and offset data may be provided to the user as a particular fabric blend composition and the relative improvements in the fabric blend composition as compared to other known fabric compositions.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A computer-implemented method of training a neural network for generating a material composition, comprising:

collecting, by a large language model of an artificial intelligence engine, material data from one or more digital data sources via the Internet;

collecting material metric data from the one or more digital data sources, the material metric data including an environmental characteristic, a durability characteristic, a comfort characteristic, and a cost characteristic, wherein the environmental characteristic includes a water consumption metric, a greenhouse emissions metric, a land use metric, a pesticide usage metric, a biodegration time metric, and an energy consumption metric, wherein the durability characteristic includes a tensile strength metric, an elongation at break metric, a Young's modulus metric, an abrasion cycles to failure metric, a burst strength metric, and a UV resistance metric, wherein the comfort characteristic includes a moisture retention metric, an air permeability metric, a thermal conductivity metric, a wicking rate metric, a static resistance metric, and a UV protection factor metric, and wherein the cost characteristic includes a raw material cost metric, a processing cost metric, a dyeing cost metric, a waste percentage cost metric, an energy cost metric, and a total manufacturing cost metric;

collecting support data for each metric included in the environmental characteristic, the durability characteristic, the comfort characteristic, and the cost characteristic of the material metric data, wherein the collected support data is data representative of the storage location of the material metric data in the one or more digital data sources accessed via the Internet, and wherein the support data identifies the storage location as at least one of website, a citation to a book, a digital library location, and a database;

selecting a material metric value for each metric included in the environmental characteristic, the durability characteristic, the comfort characteristic, and the cost characteristic from the material metric data collected from the one or more digital data sources based on prioritizing a particular material metric value for selection from the material metric data when the support data identifies the storage location for the material metric data as being one of a website, a book, a digital library location, or a database;

creating a training set comprising the selected material metric values;

training the neural network with the training set of material metric values for each metric included in the environmental characteristic, the durability characteristic, the comfort characteristic, and the cost characteristic, the training including associating each material metric value with known fabric blends based on material composition ratios of the known fabric blends;

creating a fabric generation model using the training set;

receiving a fabric generation request from a user, the fabric generation request including user preferences for prioritizing one of the environmental characteristic, the durability characteristic, the comfort characteristic, and the cost characteristic in the fabric generation request which are applied to the fabric generation model by the trained neural network; and generating, by the trained neural network applying the fabric generation model, a fabric blend based on the user preferred prioritized one of the one of the environmental characteristic, the durability characteristic, the comfort characteristic, and the cost characteristic in the fabric generation request.

2. The computer implemented method of training a neural network for generating a material composition of claim 1, wherein the material data is data representative of one or more types of raw materials.

3. The computer implemented method of training a neural network for generating a material composition of claim 2, wherein the one or more types of raw materials are raw materials for fabrics.

4. The computer implemented method of training a neural network for generating a material composition of claim 1, further comprising:

providing a fabric blend to a user device based on application of a user request to the training set data.

5. A computer-implemented method of training a neural network for generating a material composition, comprising:

collecting, by a large language model of an artificial intelligence engine, material data and material metric data from one or more digital data sources via the Internet, the material metric data including an environmental characteristic, a durability characteristic, a comfort characteristic, and a cost characteristic, wherein the environmental characteristic includes a water consumption metric, a greenhouse emissions metric, a land use metric, a pesticide usage metric, a biodegration time metric, and an energy consumption metric, wherein the durability characteristic includes a tensile strength metric, an elongation at break metric, a Young's modulus metric, an abrasion cycles to failure metric, a burst strength metric, and a UV resistance metric, wherein the comfort characteristic includes a moisture retention metric, an air permeability metric, a thermal conductivity metric, a wicking rate metric, a static resistance metric, and a UV protection factor metric, and wherein the cost characteristic includes a raw material cost metric, a processing cost metric, a dyeing cost metric, a waste percentage cost metric, an energy cost metric, and a total manufacturing cost metric;

collecting support data for each metric included in the environmental characteristic, the durability characteristic, the comfort characteristic, and the cost characteristic of the material metric data, wherein the collected support data is data representative of the storage location of the material metric data in the one or more digital data sources accessed via the Internet, and wherein the support data identifies the storage location as at least one of website, a citation to a book, a digital library location, and a database;

selecting a material metric value for each metric included in the environmental characteristic, the durability characteristic, the comfort characteristic, and the cost characteristic from the material metric data collected from the one or more digital data sources based on prioritizing a particular material metric value for selection from the material metric data when the support data identifies the storage location for the material metric data as being one of a website, a book, a digital library location, or a database;

creating a training set comprising the selected material metric values;

training the neural network with the training set including the material metric values for each metric included in the environmental characteristic, the durability characteristic, the comfort characteristic, and the cost characteristic, the training including associating each material metric value with known fabric blends based on material composition ratios of the known fabric blends;

creating a fabric generation model using the training set;

receiving a fabric generation request from a user, the fabric generation request including user preference for prioritizing one of the environmental characteristic, the durability characteristic, the comfort characteristic, and the cost characteristic in the fabric generation request which are applied to the fabric generation model by the trained neural network;

receiving a request from the user representative of specified preferences for a material;

generating, by the trained neural network applying the fabric generation model, a fabric blend based on the user specified preferences for a material based on a prioritized one of the one of the environmental characteristic, the durability characteristic, the comfort characteristic, and the cost characteristic in the fabric generation request.

6. The computer-implemented method of training a neural network for generating a material composition of claim 5, wherein the request is a natural language material generation request.

7. The computer implemented method of training a neural network for generating a material composition of claim 5, wherein the material data is data representative of one or more types of raw materials.

8. The computer implemented method of training a neural network for generating a material composition of claim 7, wherein the one or more types of raw materials are raw materials for fabrics.

* * * * *